Aug. 5, 1924.

M. O. CLAUSS

LABEL ATTACHING MACHINE 1,503,745

Original Filed July 25, 1919    7 Sheets-Sheet 3

INVENTOR
Max O. Clauss
BY C. P. Goefiel
ATTORNEY

Aug. 5, 1924.
M. O. CLAUSS
1,503,745
LABEL ATTACHING MACHINE
Original Filed July 25, 1919    7 Sheets-Sheet 4
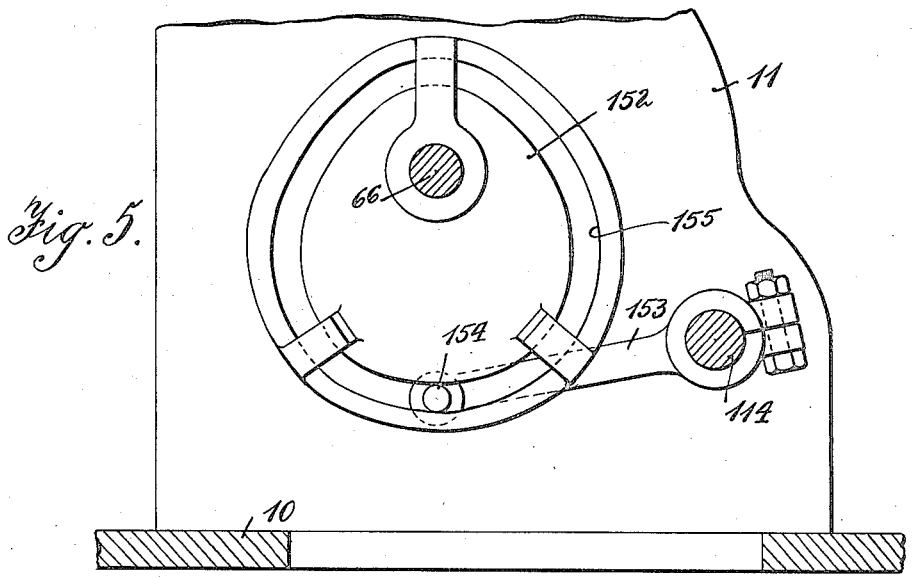
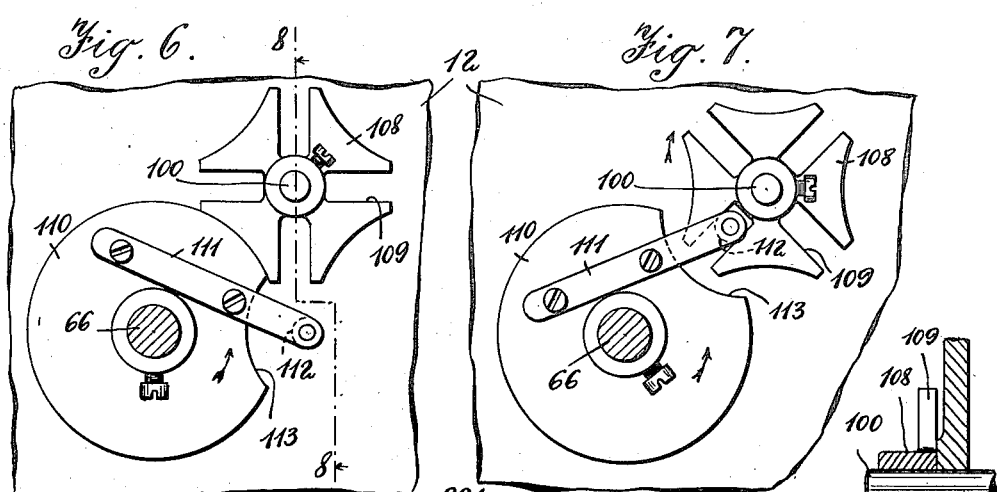
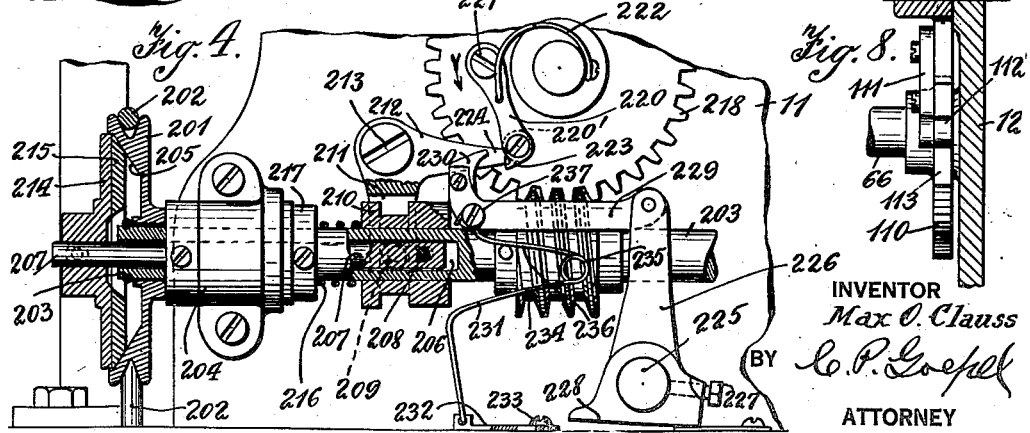
INVENTOR
Max O. Clauss
BY
ATTORNEY

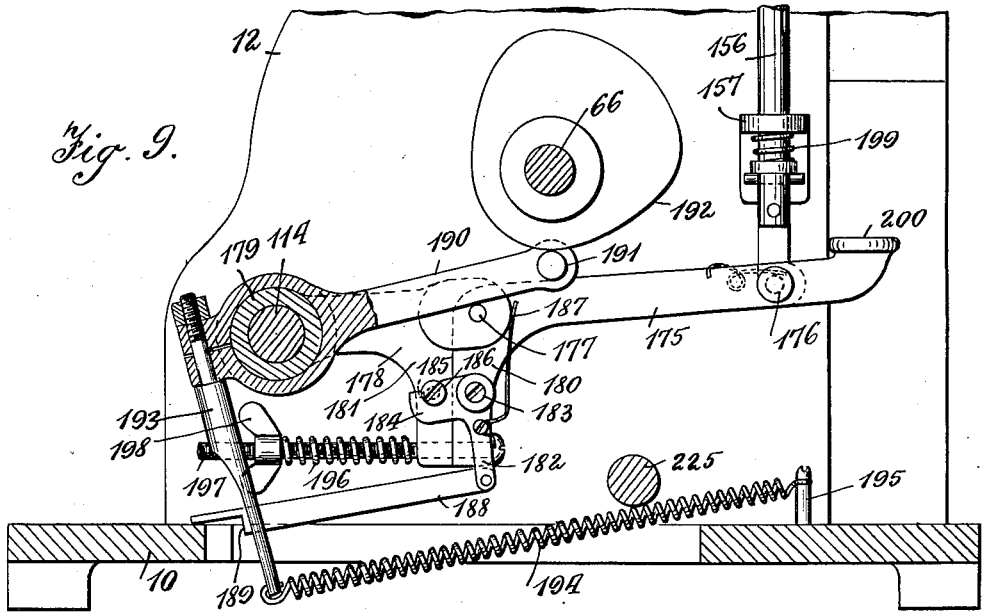
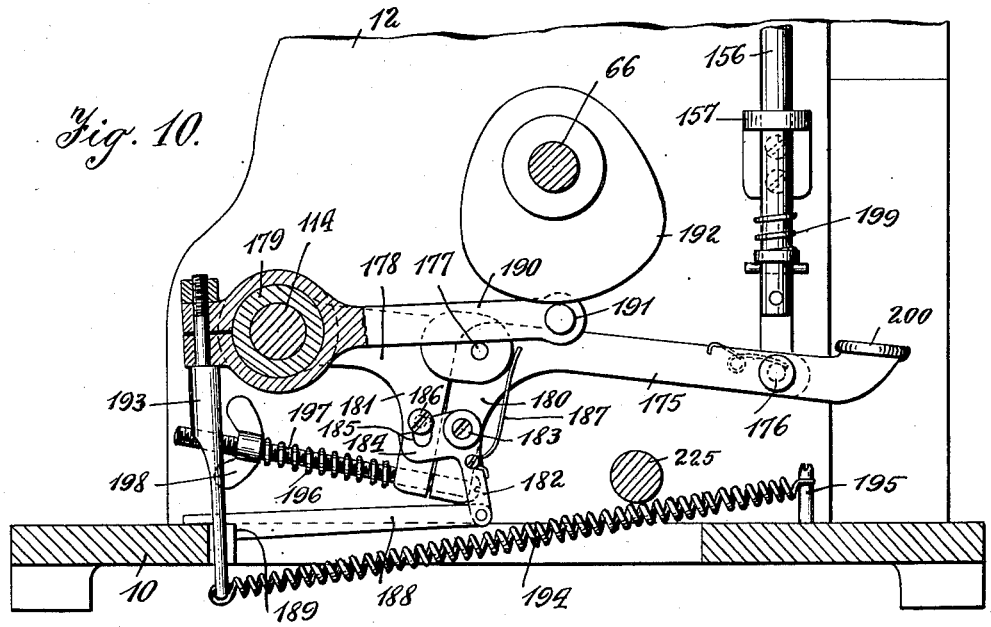

Aug. 5, 1924.
M. O. CLAUSS
LABEL ATTACHING MACHINE
Original Filed July 25, 1919   7 Sheets—Sheet 6
1,503,745
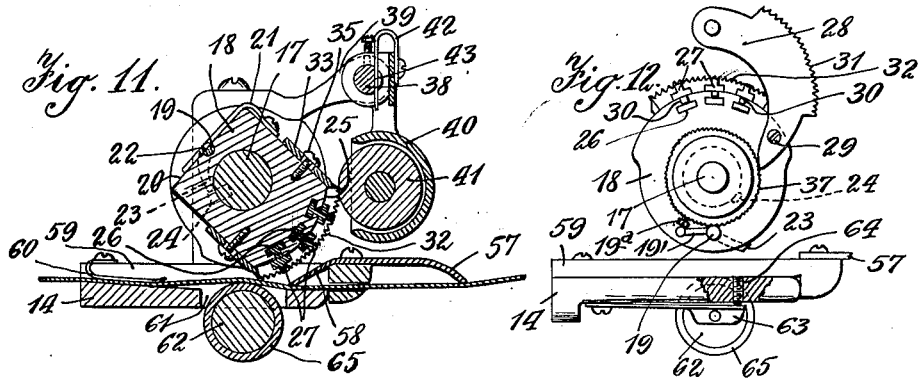
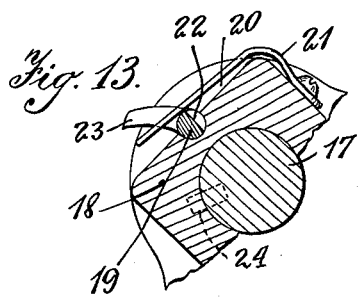
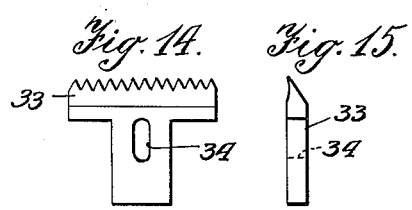
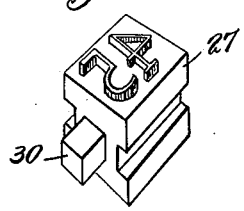
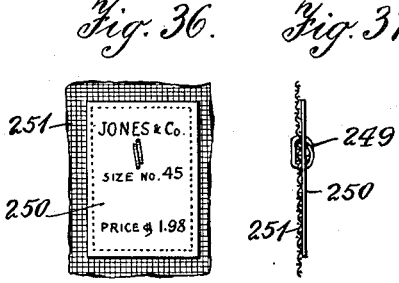
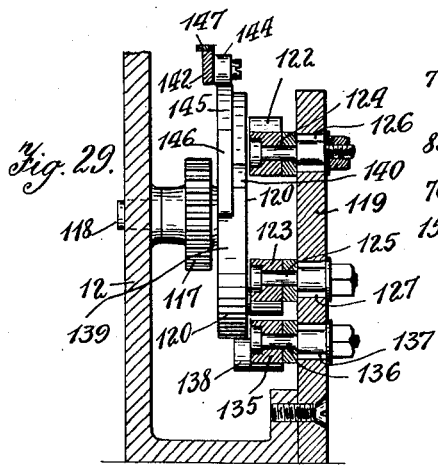
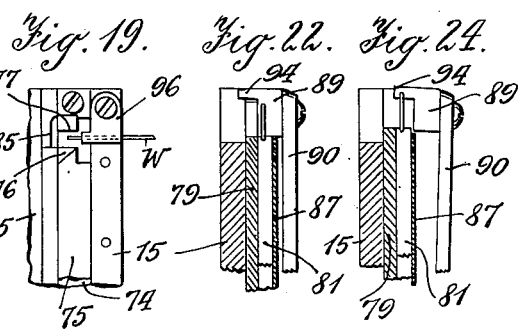
INVENTOR
Max O. Clauss
BY C. P. Goepel
ATTORNEY Aug. 5, 1924.
M. O. CLAUSS
1,503,745
LABEL ATTACHING MACHINE
Original Filed July 25, 1919   7 Sheets—Sheet 7
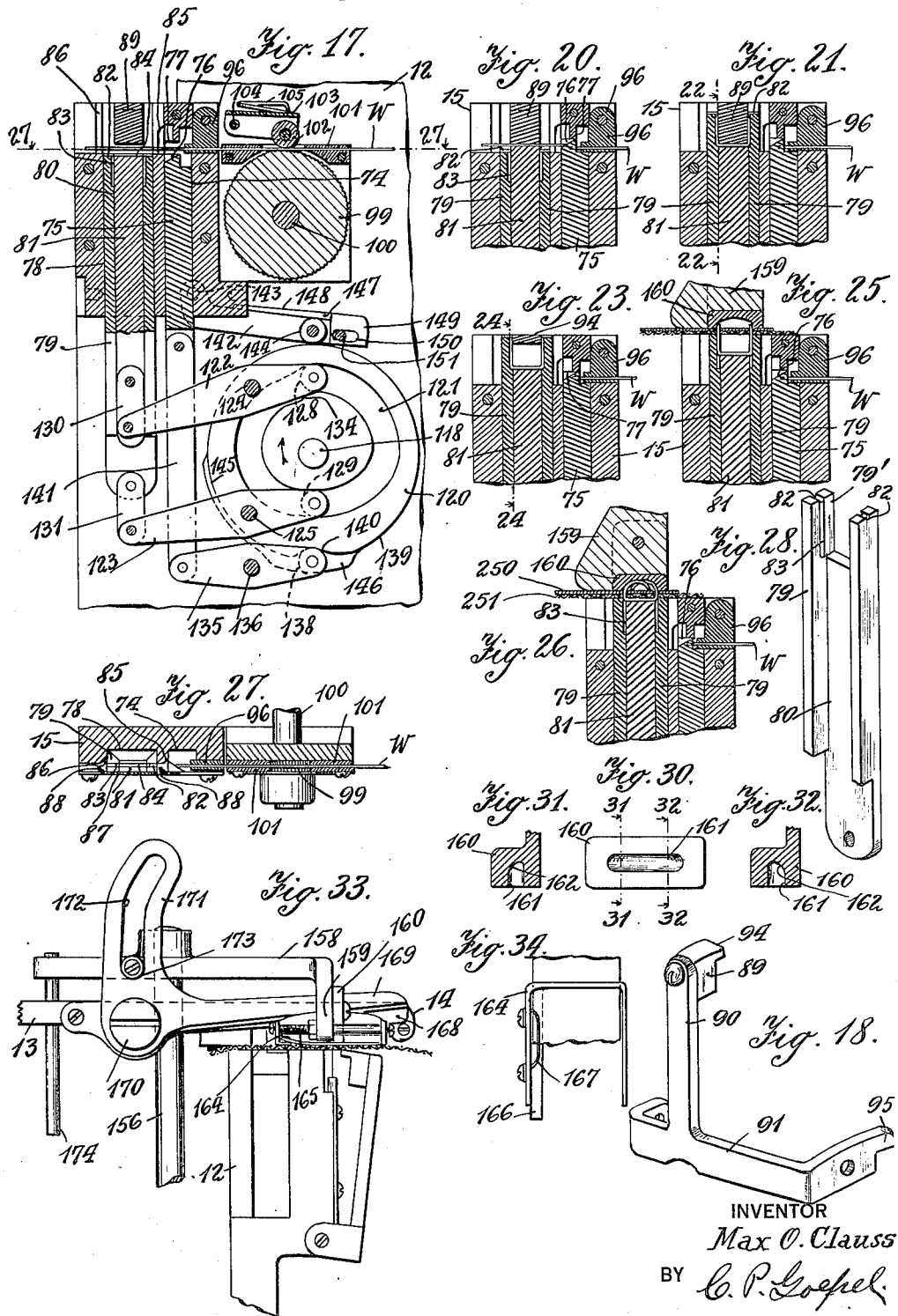
INVENTOR
Max O. Clauss
BY C. P. Goepel
ATTORNEY Patented Aug. 5, 1924.

1,503,745

UNITED STATES PATENT OFFICE.

MAX O. CLAUSS, OF NEW YORK, N. Y.

LABEL-ATTACHING MACHINE.

Application filed July 25, 1919, Serial No. 313,415. Renewed August 3, 1922. Serial No. 579,472.

*To all whom it may concern:*

Be it known that I, MAX O. CLAUSS, a citizen of the United States, and resident of the borough of Bronx, in the county, city, and State of New York, have invented certain new and useful Improvements in Label-Attaching Machines, of which the following is a specification.

This invention relates to label attaching machines of that class in which the label is first printed, then cut from the roll of paper strip and finally stapled to the stocking, garment or other article, such, for instance, as that shown in my prior Patent, No. 1,293,339, issued February 4, 1919.

One of the important objects of the present invention is to provide an improved staple forming mechanism and a comparatively simple operating means therefor, which may be readily adjusted to properly time the successive staple forming operations. Another of the detail improvements resides in the provision of improved means for clinching the ends of the staple on the label in such manner that the extremities of the staple are turned down upon the label so that they cannot engage and injure the material while the adjacent portions of the staple wire are spaced above the label whereby they may be readily bent when it is desired to withdraw the staple and remove the label.

Additional objects reside in the provision of an improved manually actuable starting means for the machine whereby it is operatively connected to a suitable source of power and is automatically disconnected from such power source at the end of each stapling operation; an improved label printing mechanism having means affording easy accessibility to the type members for the purpose of changing the same; adjustable feeding means for the paper strip; improved means for feeding the exact amount of wire necessary to form a staple; means for holding the label in position to be stapled to the goods and improved operating means therefor; and in general to produce a machine for this purpose, which will be positive and reliable in the performance of its several functions, and highly satisfactory in the results obtained.

A unique attribute of my present improvements resides in the fact that after the label has been removed from the article it cannot be again applied thereto by hand in the same manner as it was originally applied by the machine, thus enabling one to readily ascertain whether or not the label has been removed and the article used.

With the above and other objects in view, the present invention consists in the several improved mechanisms and the novel combination and arrangement of their several parts to be hereinafter described in detail and subsequently incorporated in the appended claims.

In the accompanying drawings, wherein like reference characters designate corresponding parts throughout the several views:

Fig. 4 is a fragmentary elevation, partly in section, showing the mechanism operatively connected to the power driven element;

Fig. 5 is a detail section taken on the line 5—5 of Fig. 1 looking in the direction indicated by the arrows;

Figs. 6 and 7 are detail views of the operating parts for the wire feeding mechanism;

Fig. 8 is a sectional view taken on the line 8—8 of Fig. 6 looking in the direction indicated by the arrows;

Fig. 9 is a section taken on the line 9—9 of Fig. 1 illustrating the operating means for the label holder;

Fig. 10 is a similar view, showing the relative positions of the parts when the label holder is in depressed position upon the fabric;

Fig. 11 is a detail longitudinal section through the label printing and feeding mechanism;

Fig. 12 is a detail side elevation, partly in section, showing the type holding plate in its open position;

Fig. 13 is a fragmentary section similar to Fig. 11, showing the type carrying drum released from its operating shaft;

Fig. 14 is a detail elevation of one of the adjustable feeding members for the paper strip;

Fig. 15 is an end view thereof;

Fig. 16 is a detail perspective view of one of the type members;

Fig. 17 is a vertical sectional view through the wire feeding and staple forming mechanism;

Fig. 18 is a detail perspective view of the pivoted anvil;

Fig. 19 is a detail fragmentary elevation of the wire cutter;

Figs. 20, 21, 23, 25 and 26 are sectional views similar to Fig. 17, illustrating the several operations successively performed in forming the staple and clinching the ends thereof upon the label.

Fig. 22 is a transverse section taken on the line 22—22 of Fig. 21;

Fig. 24 is a similar section taken on the line 24—24 of Fig. 23;

Fig. 27 is a horizontal section taken on the line 27—27 of Fig. 17;

Fig. 28 is a detail perspective view of the wire bending member;

Fig. 29 is a detail vertical section taken on the line 29—29 of Fig. 2;

Fig. 30 is a plan view of the clinching die;

Figure 1:
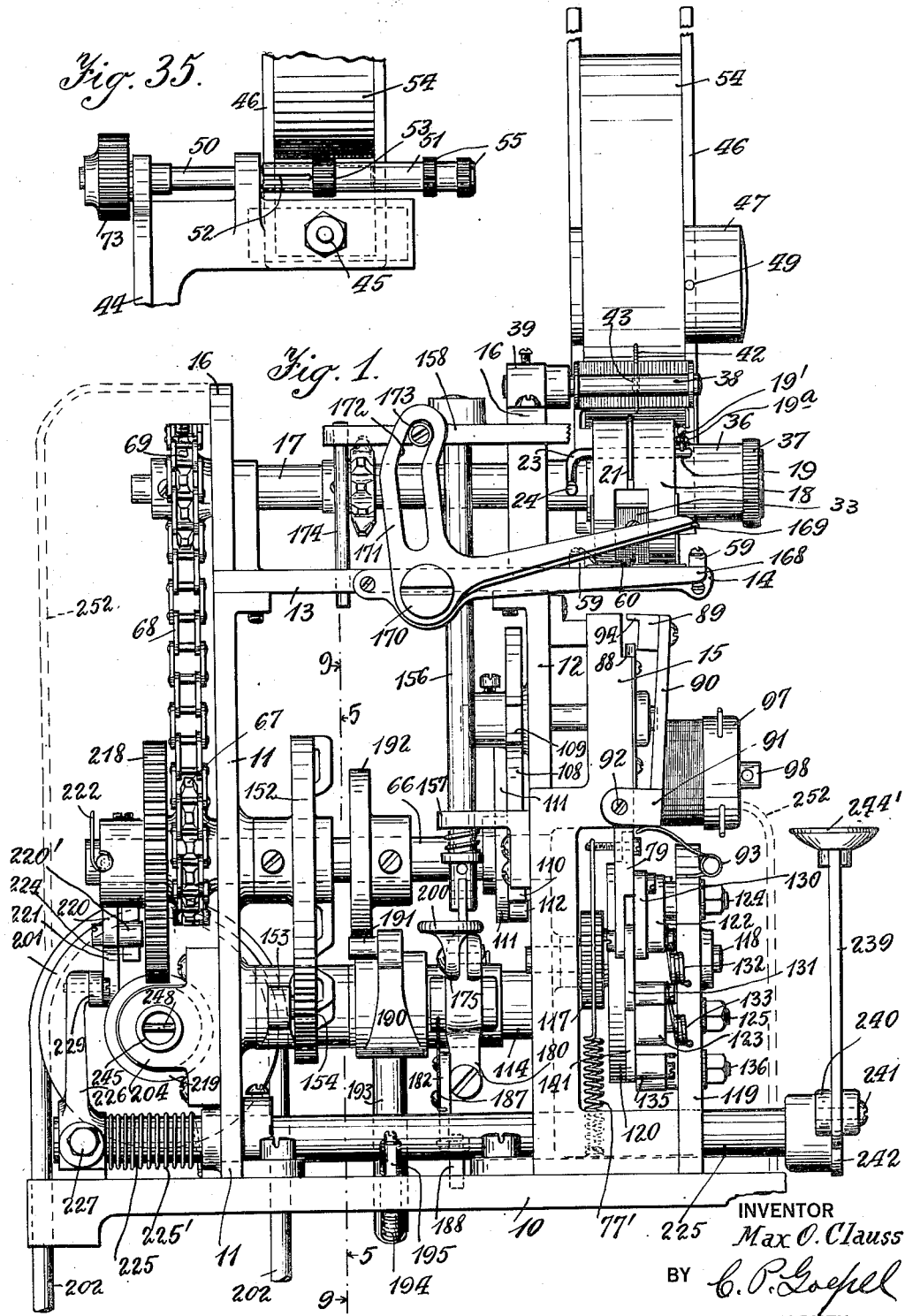
Figure 1 is a front elevation, illustrating one embodiment of the machine, the housing plates and the label holder being removed.
Figure 2:
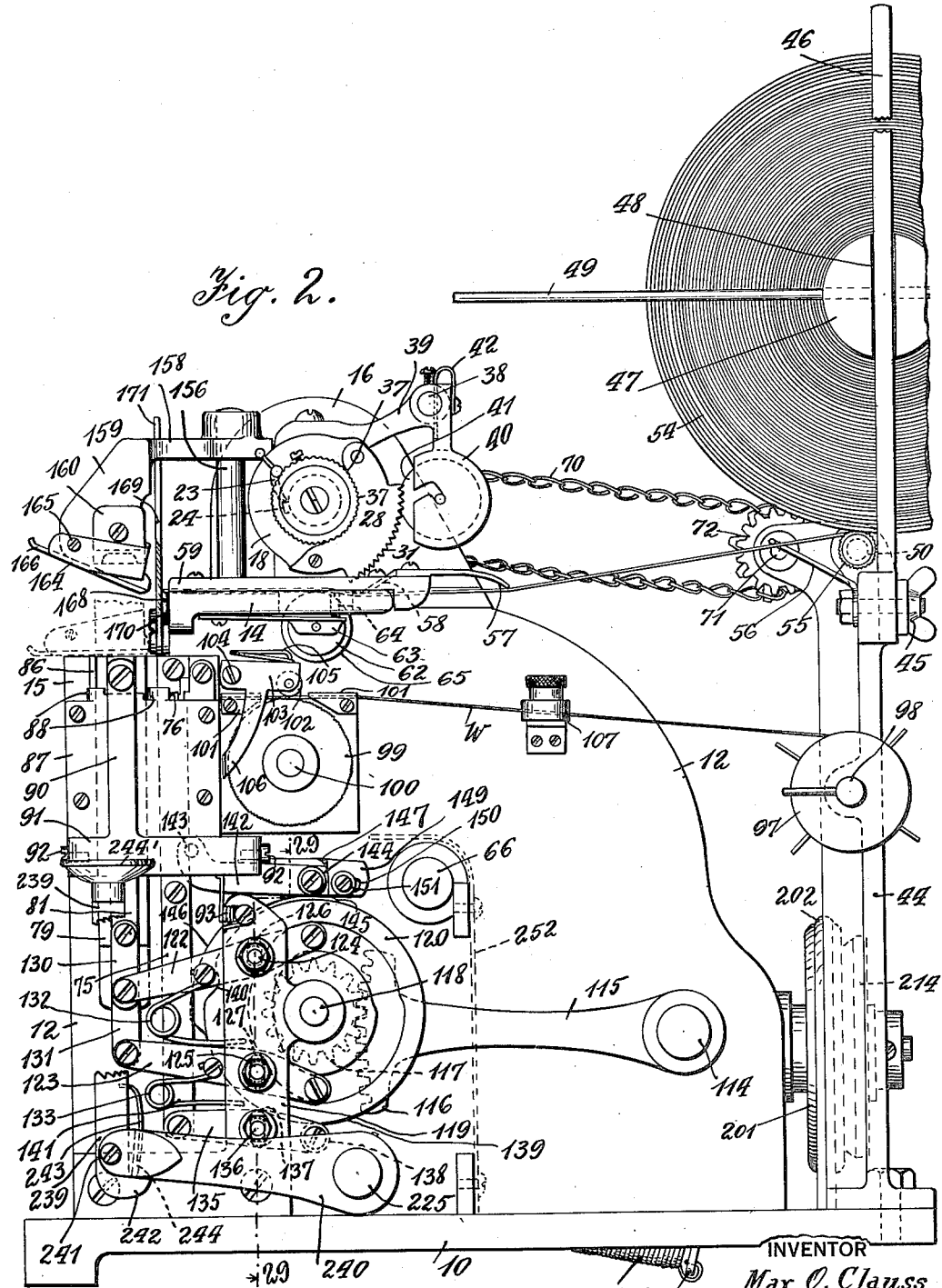
Fig. 2 is a side elevation, certain of the parts being broken away.

Figs. 31 and 32 are sectional views taken on the lines 31—31 and 32—32 respectively of Fig. 30.

Fig. 33 is a detail elevation of the label cutting and holding mechanism;

Fig. 34 is a fragmentary plan view of the label holding member;

Fig. 35 is a detail elevation of the paper strip feeding device;

Figs. 36 and 37 are plan and sectional views respectively, illustrating the manner in which the label is stapled to the fabric by means of the present invention.

The several mechanisms to be presently described are mounted and supported upon a suitable structure, which, in the illustrated embodiment of the invention, is disclosed as consisting of a bed plate 10 and the spaced vertically disposed frame plates 11 and 12 respectively, which are suitably secured upon said bed plate. The frame plates 11 and 12 are connected at their upper ends by a transversely disposed plate 13, one end of which extends laterally from the plate 12 and constitutes a feeding table designated 14, over which the paper strip is fed in the manner to be hereinafter related. The plate 12 is further provided below the feed table 14 and in advance thereof with a vertically disposed laterally offset portion 15.

The horizontal plate 13 is provided with spaced upwardly projecting bearings 16, in which a shaft 17 is rotatably mounted. A drum 18 shown in detail in Fig. 11 of the drawings is loosely engaged on one end of the shaft 17. A rod 19 is mounted in one side of the drum 18 for rocking movement and intersects a kerf 20 formed in said drum. A wire spring 21 is fixed at one of its ends to the drum and extends within the kerf 20, said spring normally bearing upon the flattened face 22 formed on one side of the rod 19, and thereby yieldingly holding said rod against rocking movement. An arm 23 is fixed to one end of the rod 19 and is normally engaged against a stud 24 projecting from the periphery of the shaft 17. An arm 19' is also fixed to the other end of this rod and is adapted to engage a stop 19ª on the drum to limit the rocking movement of said rod in one direction. It will thus be apparent that in the operative rotation of the shaft 17, the drum 18 will be caused to rotate therewith. When it is necessary to change the type carried by the drum, the rod 19 is rocked to disengage the arm 23 from the stud 24 so that the drum may be rotated relative to the shaft 17 to thereby position the type above the table so that they can be conveniently withdrawn, and other type inserted in the manner to be presently described. This drum is formed with a curved face 25 concentrically related to the shaft 17, and in this curved face a series of spaced longitudinally extending grooves 26 are formed. These grooves receive the type members 27, one of which is shown in detail in Fig. 16. The grooves 26 open upon one side of the drum 18 and the type members are held or retained within said grooves by means of the arcuate plate 28 pivoted at one of its ends as at 29 to the drum 18. This plate when in its closed position extends over the ends of the type receiving grooves, so as to prevent any possibility of the longitudinal movement of the type. The type members are provided with lugs 30 which, when the plate 28 is in its open position, as seen in Fig. 12, may be readily engaged and the type members withdrawn so that others may be substituted therefor.

The plate 28 is formed with a toothed or serrated flange 31, which extends in concentric relation to the curved face 25 of the drum in the closed position of said plate. A similarly toothed or serrated plate 32 is secured upon the opposite side of the drum 18. These toothed or serrated plates project slightly beyond the faces of the type members 27. Additional serrated feed members 33 are arranged upon the drum 18 at right angles to the plates 28 and 32. Each of these members is formed with a slot 34 to receive a screw 35 threaded in the drum. It will thus be apparent that the members 33 can be readily adjusted tangentially upon the drum 18 with respect to the other feed plates 28 and 32, to thereby insure a proper feed of the paper strip over the surface of the table 14. The drum 18 is provided with a tubular extension or sleeve 36, having a milled flange 37, so that said drum may be conveniently rotated when the rod 19 is rocked and the arm 23 disengaged from the stud 24 to thereby dispose the type members in the position seen in Fig. 12, where they can readily be removed and changed as above explained. If the operator should neglect to return the plate 28 to its closed position, this plate will be automatically returned to such position in the rotation of the drum as the serrated flange 31 thereof engages the paper strip.

A bearing rod 38 is fixed in an arm 39 secured to one of the bearings 16 and a housing 40 is suspended from this rod for swinging movement. Within this housing an inking roller 41 is rotatably mounted. The housing is yieldingly held against swinging movement by means of a leaf spring 42, the free end of which is engaged in a recess 43 formed in one side of the rod 38. This spring serves to yieldingly urge the roller to its normal position, as seen in Fig. 11, for engagement by the printing faces of the type members 27 as the drum 18 is rotated.

A standard 44 is fixed upon one end of the bed plate 10 and upon the upper end of this standard a vertically disposed guide for the paper strip roll is secured as shown at 45. This guide is provided with spaced vertically extending arms 46, which are received in grooves or channels 48 formed in the ends of the paper roll core 47. Rods 49 are fixed in the core and extend horizontally in opposite directions therefrom to prevent shifting movement of the paper roll on the core.

In suitable bearings upon the upper end of the standard 44 a shaft 50 is mounted and on this shaft a sleeve 51 is frictionally engaged, said sleeve being longitudinally split as at 52 to produce a frictional clamping pressure on the periphery of the shaft. The sleeve is provided intermediate of its ends with a milled flange 53, upon which the paper strip roll designated 54 normally rests, and by which the roll is rotated upon the core 47. At its outer end the sleeve 51 is provided with the additional knurled or milled portions 55, so that said sleeve may be conveniently rotated relative to the shaft 50, when it is necessary to manually feed the paper strip into proper relation to the printing and feeding drum 18. From the roll 54 the paper strip passes under the angularly disposed terminal of a guide finger 56, which is secured to the standard 44 by means of the clamp 45.

To the rear end of the feed table 14 a rearwardly extending downwardly curved plate 57 is secured and directs the paper strip over the surface of the table 14 and beneath a downwardly inclined flange 58, which is formed upon the forward end of said plate. Longitudinally extending bars 59 are secured upon the upper surface of the table 14 and prevent lateral shifting movement of the paper strip as it is fed longitudinally thereover. A spring 60 is fixed to one of these plates and extends longitudinally of the table and has bearing engagement upon the paper to retain the same upon the surface of the table.

The table 14 is provided with an opening 61 through which the upper portion of a platen 62 projects. The platen trunnions at the ends thereof are journaled in the free ends of the resilient bearing plates 63. Adjustable screws 64 are threaded in the table 14 and engage the bearing plates 63, whereby the extent of the upward projection of the platen through the opening 16 may be varied as desired. This platen preferably consists of a cylindrical body of brass or other metal upon which a sheath of rubber or other suitable friction material 65 is secured. It is to be particularly noted that the lower end of the inclined flange 58 holds the paper strip closely upon the surface of the table, as it approaches the platen and the periphery of the platen extends above the plane of the table surface. Thus, the paper strip is caused to assume a curvature as it passes over the platen, which is reversed to the curvature of the face 25 of the drum 18 in which the type are arranged. Thus, the type will strike squarely upon the paper as it is drawn forwardly over the platen by the several serrated feeding plates carried by the drum. Under the pressure of these feeding plates on the paper there will be a slight downward yielding movement of the platen. Thus, there will be a clean impression of the type faces on the paper, and such printed impression will not be smeared or blurred.

In the frame plates 11 and 12 the main operating shaft 66 is journaled. A sprocket wheel 67 on one end of the shaft is connected by the drive chain 68 to a similar sprocket wheel 69 fixed upon the end of the shaft 17. This shaft is in turn connected by a chain 70 to a shaft 71, mounted in the upper end of the standard 44. A pinion 72 fixed on the shaft meshes with a similar pinion 73 secured on the end of the shaft 50. It will thus be seen that the primary feeding sleeve 51 for the paper strip and the feeding and printing drum are operated in such relation that exactly the necessary length of the paper strip will be fed from the roll in each operation of the machine.

The lateral extension 15 on the plate 12 is provided with a groove or channel 74 to receive a reciprocatory wire cutting member 75, the upper end of which is formed with the beveled cutting edge 76, which operates in opposed relation to the fixed cutting member 77, secured in the upper end of said channel. The portion 15 of the frame plate is also provided with a second relatively wide channel 78, in which a wire bending member 79 reciprocates. This bending member is itself of channel shaped form and within the channel 80 thereof the staple projecting member 81 is arranged for relative reciprocatory movement. At its upper end the base wall of the wire bending member 79 is cut away or recessed as shown at 79' to accommodate the anvil to be later referred to. The side flanges of the member 79 have grooves 82 formed in their upper edges, which constitute continuations of the longitudinal grooves 83 on the inner side faces of said flanges. The staple projecting member 81 is also provided in its upper end face with a groove 84. At the opposite sides of the channel 78, the fixed plate 15 is formed with the beveled faces 85 and 86 respectively, which serve to direct the staple wire and prevent the same from buckling. The face plate 87, which is secured to the plate 15 over the several reciprocating parts is provided on its upper end with the inwardly inclined fingers 88, which also coact with the wire and properly position the same across the channel 78 in line with the grooves in the ends of the members 79 and 81. One end of a contractile spring 77' is connected to the reciprocatory wire severing member 75. This spring acts to maintain the cutting edge of the member 75 in proper relation to the edge of the fixed severing member 77 whereby a proper shearing cut of the wire is obtained.

An anvil 89 is secured upon the upper end of a vertically disposed arm 90 formed upon the yoke member 91. The ends of this yoke member are pivotally mounted as at 92 upon the plate 15. The anvil 89 is normally held within the upper end of the channel 78 by means of the spring 93, which bears at one of its ends against the yoke member 91, said anvil being formed with a lip 94, the purpose of which will be presently explained. One of the arms of the yoke 91 has a finger or extension 95 formed upon its end.

A wire guide member 96 is fixed to the plate 15 adjacent the fixed wire cutting member 77. The wire W, from which the staple is formed, is drawn from a spool 97 mounted upon a spindle 98, which is fixed to the standard 44.

The wire W is fed to the staple forming mechanism by means of a periphery milled disk or wheel 99 fixed upon the shaft 100. The wire is held in contact with the upper edge of the disk 99 by means of the guide members 101. A roller 102 is mounted in the channel bar 103 at one end thereof, said bar being pivoted at its other end as at 104. The spring 105 exerts a downward pressure upon the bar 103, thereby causing the roller 102 to bear upon the wire W and hold the same in frictional contact with the milled surface of the disk 99. The bar 103 is formed with a suitable finger piece 106 whereby the pressure of the roller 102 on the wire may be released. Preferably, the wire is drawn through a cup 107 mounted upon plate 12, which contains felt or other suitable material saturated with a lubricant. By lubricating the wire, frictional wear on the parts with which it contacts is minimized and the wire staple may also be more readily projected through the goods and the label, and without injury to the former. Upon the inner end of the shaft 100 a Geneva gear 108 is fixed, having the usual radially extending slots 109. A disk 110 is fixed upon the main operating shaft 66 and to one side of said disk an arm 111 is secured. This arm projects beyond the periphery of the disk and has a roller 112 mounted thereon for engagement in the slots 109 of the gear 108. The disk 110 is formed with a cavity 113 adjacent to the arm 111 to accommodate the gear 108 in the relative rotation of said gear and the disk 110. It will be apparent from this arrangement that in the continuous rotation of the main operating shaft 66, an intermittent rotation is imparted to the shaft 100 and consequently to the wire feeding disk 99, which is fixed thereon. The gear 108 is of such size and the arm 111 carried by the disk 110 is so related thereto that exactly the proper length of wire is fed to the staple forming mechanism in each operation of the machine, from which a single staple may be formed.

A rock shaft 114 is journaled at its ends in the frame plates 11 and 12, and to one end of this rock shaft an arm 115 is fixed, said arm being formed with a rack 116. This rack meshes with a pinion 117 fixed on a shaft 118, which is mounted in suitable bearings on the plate 12 and on a vertical bearing standard 119. A cam wheel 120 is also fixed on the shaft 118 and is provided in its outer face with the cam track 121. Levers 122 and 123 respectively are fulcrumed intermediate of their ends in the standard 119, the fulcrum pins or studs 124 and 125 being vertically adjustable in the slots 126 and 127 respectively, which are formed in said standard. These levers are provided upon one of their ends with the rollers 128 and 129 respectively, which are engaged at diametrically opposite points in the cam track 121. The other end of the lever 122 is connected by means of the link 130 to the lower end of the staple projecting member 81, while the corresponding end of the lever 130

123 is operatively connected by means of a similar link 131 to the lower end of the wire bending member 79. Springs 132 and 133 are connected to the levers 122 and 123 respectively and act to yieldingly urge the forward ends of said levers in an upward direction. It will be noted with reference to Fig. 17 of the drawings that the cam track 121 has an abrupt curve or off-set 134 therein, with which the roller 128 on the lever 122 cooperates. An additional lever 135 is also fulcrumed intermediate its ends upon the pin or stud 136, which is likewise vertically adjustable in a slot 137 formed in the standard 119. The roller 138 on the rear end of this lever engages the peripheral cam face 139 of the disk 120. This cam face is formed with a depression or cavity 140. The other end of the lever 135 is operatively connected to the movable cutting member 75 by means of the link 141.

A lever 142 is arranged above the cam disk 120 and is pivotally mounted at one of its ends as at 143 upon the face of the plate 12. This lever carries a roller 144, which is held by gravity upon the peripheral face of the cam disk 120. From reference to Fig. 29 of the drawings it will be noted that the roller 138 of lever 135 does not extend across the entire width of the peripheral face of the cam, but is engaged only on one side thereof. The roller 144 on the lever 142 contacts upon the other side or section of the cam face. This portion of the cam face is formed with a rib or flange having a relatively thin major circumferentially extending portion 145 and a thicker relatively short portion 146. This rib or projection on the cam face is adapted to coact with the roller 144 and actuate the lever 142. Upon the upper edge of the lever 142 a shim 147 is arranged and is formed with a longitudinally inclined upper face 148 upon which the finger 95 of the pivoted yoke 91 is engaged. This shim is formed with a flange 149 at one of its ends, having a slot 150 therein to receive a set-screw 151, which is threaded in the lever 142, and whereby the shim may be longitudinally adjusted upon the lever to compensate for wear and assure the proper actuation of the anvil 89.

The rock shaft 114 is actuated through the medium of a suitable cam structure 152, which is fixed upon the main operating shaft 66. An arm 153 fixed upon the rock shaft carries a roller 154, which is engaged in the track 155 of the cam 152. This cam is of such form as to impart a sufficient rocking movement to the shaft 114 in each complete revolution of the shaft 66 to transmit a half revolution to the cam disk 120.

A rod 156 is vertically movable through the horizontal plate 13 and through a suitable guide bracket 157 fixed to the plate 12. This rod at its upper end is provided with a horizontally disposed arm 158, one end of which is angularly off-set and terminates in a depending portion 159. To one side of this depending terminal of the arm a die member 160 is fixed, said die member as shown in detail in Figs. 30, 31 and 32 being provided in its bottom face with a single longitudinally extending groove 161. The base wall of this groove at its ends is curved in relatively opposite directions as shown at 162 for the purpose of directing the ends of the staple towards the opposite sides of the groove, so that they may pass each other without interference as they are bent or clinched upon the label. A label holder 164, which is of substantially U-shaped form is loosely mounted at its ends upon a pin 165, which is fixed in the terminal 159 of the arm 158. The arm at the inner side of this holder is provided upon its lower edge with an angularly disposed longitudinally extending flange 166, and a wire spring 167 extends longitudinally above this flange and has its extremities fixed to the arm of the holder. This spring is adapted for engagement upon one edge of the printed label and holds the label against shifting movement relative to the goods while it is being stapled thereto.

To the forward edge of the table 14 a cutting blade 168 is fixed. A movable cutting blade 169 is pivotally mounted as at 170, and is formed on its pivoted end with an upwardly extending curved arm 171, having a slot 172 therein, in which a roller 173 carried by the horizontal arm 158 is engaged. The inner end of the arm 158 has a downwardly extending guide rod 174 fixed thereto and movable through an opening in the horizontal plate 13.

To the lower end of the rod 156 a lever section 175 is pivotally connected as at 176. At its rear end, this lever section is pivotally connected, as shown at 177, to a lever section 178, which is fixed to a sleeve 179 mounted upon the rock shaft 114 for turning movement with respect thereto. These lever sections at their pivotally connected ends are formed with the downwardly extending foot portions 180 and 181 respectively. The lever sections are normally connected and held against relative pivotal movement by means of a suitable latch device, which, as herein shown, comprises a bell crank lever 182, fulcrumed upon the foot 180 of the lever section 175, as at 183, and having its arm 184 provided with a notch or recess 185 to receive a pin or stud 186 fixed in the foot 181 of the lever section 178. This bell crank lever is normally held in its effective position to prevent the relative movement of the jointed lever sections by means of a spring 187, and to the other arm of the bell crank lever a rearwardly extending bar 188 is pivotally connected. The rear end of said bar slides upon the surface of the bed plate 10 and is formed with a stop shoulder 189, which coacts with the bed plate to limit such rearward sliding movement.

Upon the sleeve 179 a forwardly extending arm 190 is securely clamped or otherwise fixed. A roller 191 on the forward end of this arm is operatively engaged by a cam 192 secured upon the main operating shaft 66. A rod 193 is fixed to the rear end of the arm 190 and extends downwardly therefrom. A contractile spring 194 is connected to this rod at its rear end and has its forward end suitably secured to the bed plate 10, as at 195. This spring normally acts to maintain the roller 191 in engagement with the cam 192 and to move the jointed lever and the rod 156 upwardly and thus return the label holder to its normal position.

The sections of the jointed lever are yieldingly held against relative movement by means of a coil spring 196, which surrounds a rod 197 extending rearwardly through the foot portions 180 and 181 of the lever sections. The tension of this spring may be suitably adjusted by means of the nut 198 threaded on the rod 197 and acting against the rear end of the spring 196. The forward end of this spring engages the foot portion 181 of the lever section 178.

The upward movement of the rod 156 is cushioned by means of a spring 199, which surrounds said rod and is adapted for engagement with the guide bracket 157. The forward end of the lever section 175 is formed with a suitable finger piece 200 whereby the jointed lever may be manually operated. By means of this construction it will be apparent that if the material to which the label is stapled should be of such a thickness that the label holder will engage upon the material before the full downward movement of the rod 156 is completed, the rear lever section 178 may move relative to the forward lever section 175 in the continued rotation of the cam 192, as these lever sections will have been disconnected owing to the engagement of the shoulder 189 of the bar 188 with the bed plate and the movement of the latch lever 182 to its released position, as seen in Fig. 10 of the drawings.

Figure 3:
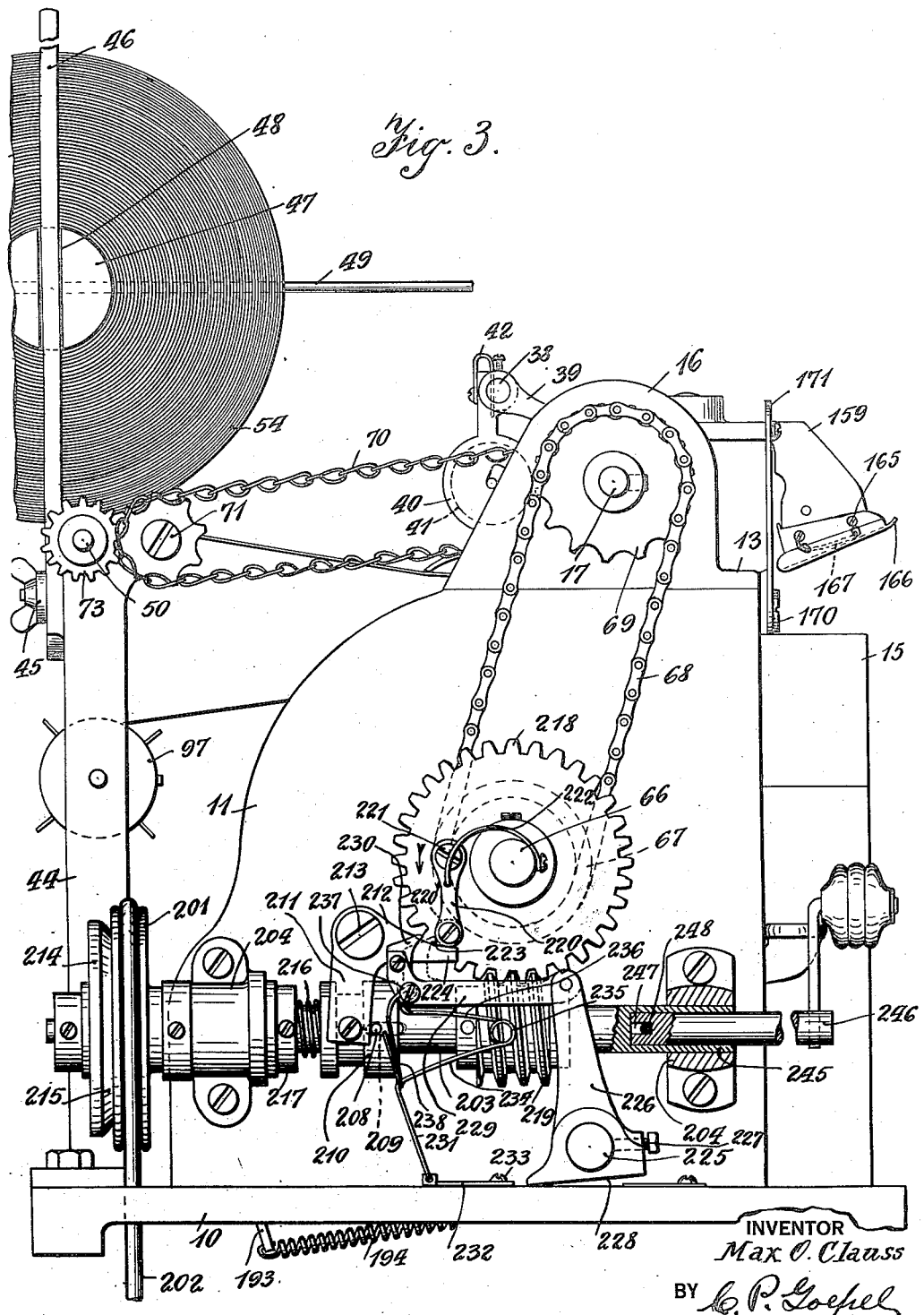
Fig. 3 is an elevation of the opposite side of the machine showing the automatic stop mechanism.

In Figs. 3 and 4 of the drawings I have illustrated the mechanism through the medium of which the operation of the several mechanisms above described is controlled. As therein shown, the primary driving element 201 is in the form of a belt wheel which is driven from a motor or other suitable source of power by the driving belt indicated at 202. This element is loosely mounted upon the driven shaft 203, which is journaled in suitable bearings 204 fixed to the frame plate 11 and is provided with an annular beveled friction face 205. The shaft 203 is formed with a tubular portion 206 to accommodate the reciprocatory clutch actuating rod 207. A transversely disposed pin 208 fixed in this rod is shiftable in the slots 209 formed in the tubular section of the shaft 203. The extremities of this pin are fixed in a collar 210 loosely surrounding the shaft 203, and with this collar the bifurcated arm 211 of a bell crank lever 212 is operatively engaged. This lever is fulcrumed upon the frame plate 11, as at 213.

To the end of the rod 207, projecting beyond the end of the shaft 203, a clutch disk 214 is fixed, said disk being faced with leather or other suitable friction material 215 for engagement with the face 205 of the power driven element. A coil spring 216 surrounds the shaft 203 and bears at one of its ends against the collar 210 and at its other end against the collar 217 fixed on said shaft.

Upon the main operating shaft 66 a worm gear 218 is fixed and is operatively engaged by the worm 219 secured on the shaft 203. A tappet member 220 is pivoted at one of its ends as at 221 upon the face of the worm gear 218 and is yieldingly held against pivotal movement by means of the spring 222. The tappet member 220 has a lip or projection 223 on its free end. After one stapling operation has been completed and the worm gear 218 has made a full rotation a roller 220' carried by the tappet member 220 strikes upon the laterally extending arm 224 of the bell crank lever 212 and oscillates said lever on its fulcrum, as shown in Fig. 3, to thereby move the collar 210 on the shaft 203 against the action of the spring 216, and thus axially shift the rod 207 within the tubular portion of said shaft to move the clutch disk 214 away from the clutch face 205 of the power element 201. In this manner, the transmission of rotation to the worm 209 is discontinued and the machine promptly brought to a full stop.

A manually operable means is provided for releasing the tappet member 220 from engagement with the clutch shifting lever 212, so that the next operation of the machine may be continued. This starting means includes a rock shaft 225, which is mounted in the plates 11 and 12, and to one end of which an upwardly extending arm 226 is fixed by means of the set screw 227. The lower end of this arm is enlarged and provided with a flat elongated bottom face 228 to limit the rocking movement of said shaft. A coil spring 225' surrounding the rock shaft yieldingly holds the shaft against rotation in one direction and retains the parts in their normal positions, as seen in Fig. 3. To the upper end of the arm 226 a lever 229 is pivotally connected at one of its ends, the other end of said lever being upwardly curved and having a dog 230 fixed thereto. In order to support this lever for horizontal rectilinear movement so that the dog 230 will properly strike the lip 223 on the tappet member 220, I provide a yieldable supporting element of peculiar construction. This support is formed from a single length of spring wire designated generally 231, said wire at one of its ends being hingedly connected to a slotted plate 232, which is longitudinally adjustable upon the bed plate 10, and may be secured in its adjusted position by the set screw 233. This wire is bent to adjust a laterally projecting portion 234, at the end of which one or more spring coils 235 are formed in the wire. From the spring coils the wire is extended in divergent relation to the part 234 thereof, as shown at 236, and is bent around the shank of a screw 237, which is threaded in the lever 229. From this screw the wire extends downwardly and has a hook or bend 238 formed therein within which the portion 234 of the wire is received. It will thus be seen that the spring coils 235 tend to urge the free end of the lever 229 upwardly while the terminal hook 238 in the spring wire limits such upward movement of the lever. As the shaft 225 is actuated and the arm 226 moved from the position shown in Fig. 3 to the position seen in Fig. 4, the spring support will move as a unit, owing to its hinged connection to the plate 232. By adjusting this plate upon the bed plate 10 the free end of the lever 229 may be adjusted and raised or lowered so as to properly position the dog 230. This dog striking upon the lip 223, as shown in dotted lines in Fig. 3, will move the free lower end of the tappet member 220 with respect to the lever and thereby disengage said tappet member from the end of the lever arm 224. The spring 216 then immediately acts against the collar 210 to move the clutch disk 215 into effective driving engagement with the power element 205.

While any preferred means may be adopted for manually actuating the rock shaft 225, I have provided for this purpose a vertically disposed lever 239 pivoted as at 241 in the bifurcated end of an arm 240, which is fixed on the end of the rock shaft 225. The lever is formed at its lower end with a laterally projecting lug 242 normally held in engagement with the lower edge of the arm 240 by means of a spring 243, one end of which is engaged in a groove 244 formed in the end of the arm 240, while the other end of said spring is fixed to the lever 239. At its upper end this lever is equipped with a suitable hand engaging head 244.

The shaft 203 has an additional tubular end portion 245 in which one end of a manually operable crank 246 is adapted to be inserted. At its extremity this end of the crank is provided with a notch or recess 247 to receive a pin 248 extending transversely through the tubular section of the shaft. This detachable crank is employed for initially setting the mechanisms, after which it is detached and the operation of the machine continued by means of the motor or other power.

In the operation of the machine, the articles to which the labels are to be stapled are conveniently piled at one side of the machine adjacent to the table 14. The starting lever 239 is at all times held in a perpendicular position by means of the spring 243, which in the downward movement of the lever under the pressure of the operator's hand will yield so that the vertical position of the lever will be maintained and the hand engaging head will not shift and chafe the hand of the operator. Upon the depression of this lever, the shaft 225 is rocked and the starting mechanism actuated to release the pivoted tappet member 220 from its engagement with the clutch shifting lever 212, as above explained. Thereupon, rotary motion is transmitted to the main operating shaft 66 through the medium of the worm gearing 218 and 219. At the start of the operation, the several parts of the stapling mechanism and the actuating levers therefor are in substantially the relative positions seen in Fig. 17 of the drawings. The wire feeding disk 99 is first actuated to feed the necessary length of wire forwardly through the member 96 and position the same across the channel 78 above the wire bending and staple projecting members, as shown in said figure. The shaft 114 is now rocked, so that the cam disk 120 is rotated in the direction indicated by the arrow in Fig. 17. The roller 128 on the lever 122 will move into the abruptly curved section 134 of the cam track 121, thereby moving the staple projecting member 81 upwardly and into engagement with the wire to clamp and hold the wire against the anvil 89. Also simultaneously with this actuation of the member 81, the roller 138 of lever 135 rides out of the depression or cavity 140 in the peripheral face of the cam disk 120, and thereby moves the wire cutting member 75 upwardly. This member in conjunction with the fixed cutting member 77 by a shearing action severs the requisite length of wire from which the staple in formed. During these operations, it will be understood that the paper strip is being fed forwardly from the roll over the table 14 by the feeding and printing drum and the desired printed matter is impressed upon the paper strip in the manner heretofore described. As the printed label strip is forced forwardly beyond the table 14, it is received in the holder 164 and held by means of the spring 167. The cam 192 then operates the jointed lever 175, 178, and through the medium of the rod 156 the holder is moved downwardly. One of the articles to be stapled is positioned between the holder and the upper end of the off-set portion 15 of the frame plate 12. At the start of this downward movement of the holder, the roller 173 riding downwardly in the curved portion of the slot 172 actuates the movable cutting blade 169 and severs the printed label from the paper strip. The downward movement of the holder is continued until the label is positioned upon the fabric article.

In the continued rotation of the cam disk 120, the roller 129 is acted upon by a portion of the cam track 121 to oscillate the lever 123 and force the wire bending member 79 upwardly. This member engages the severed length of wire at the opposite sides of the anvil 89 and bends the end portions of the wire around this anvil and against the opposite sides thereof, the anvil being received in the recessed upper end 79' of the member 79. The portion 145 of the peripheral cam rib on the disk 120 now comes into contact with the roller 144 and slightly elevates the free end of the lever 142. The plate 143 on this lever engaging the finger 95 on the yoke member 91 oscillates this yoke member and withdraws the body portion of the anvil 89 from the channel 78 and the path of movement of the staple projecting member 81. The ends of the staple, however, remain in engagement with the opposite sides of the lip 94 on the anvil, which serves as a guide for the staple. The projecting member 81 is now further actuated by the cam disk 120 and moved upwardly to project the staple ends through the goods and the printed label. The extremities of the staple strike against the reversely curved base walls at the ends of the groove 161 in the die member 160 and the ends of the wire are bent inwardly towards and past each other. This base wall of the groove 161 is longitudinally curved so as to cause the staple ends to assume the curvature indicated at 249 in Fig. 37, the extremities of the wire being directed downwardly and against the surface of the printed label 250. Thus, the label is securely affixed to the fabric 251. However, as the curved end portions of the staple are spaced from the surface of the label they may be readily grasped and bent outwardly, in order to withdraw the staple and detach the label from the goods. Owing to this peculiar manner in which the ends of the staple wire are bent, it would be manifestly impossible for one to replace the label and secure it to the goods by means of the staple in the same manner as this operation is originally performed by means of the machine. It is therefore possible to easily detect when the label has been removed from the article and the latter used, which feature is of paramount importance to merchants who have adopted to policy of delivering articles on approval without payment of the purchase price. After these several operations have been performed, the rocking movement of the shaft 114, and consequently the rotation of the cam disk 120, is reversed, and the parts are returned to their former positions readily for a second operation. At this time the tappet 220 on the worm gear 218 strikes upon the lever arm 224 and shifts the collar 210 to disengage the clutch 214 from the clutch face of the power driven element 201. The operation of the machine is thus instantly discontinued, so that another article may be positioned for the stapling of a label thereto and the starting mechanism actuated to again release the clutch member for movement to its effective driving position, in the manner above explained. After the label has been stapled to the article the latter can be readily withdrawn by a lateral movement from beneath the holder 164, the label being thereby released from the grip of the spring 167. By such construction of the label holder, it is possible to remove the labeled article very easily and quickly and dispose the same upon a pipe separately from the articles which remain to be labeled. It will, of course, be understood that after the cam disk 120 has completed its half revolution and is reversed to return the parts to their normal positions, in the latter operation, the disk 110 on the main operating shaft continues its rotation and the arm 111 is again brought to approximately the position seen in Fig. 6 of the drawings, and during such continued rotation of the disk 110, the wire feeding device remains inoperative.

From the foregoing description, considered in connection with the accompanying drawings, the construction and the manner of operation of my improved label attaching machine will be clearly and fully understood. It will be appreciated that I have in several respects very materially improved my original invention, enhancing the utility thereof and rendering the same more practical in its construction, positive and reliable in its operation and less likely to get out of order. Preferably, suitable housing plates indicated in the accompanying drawings by dotted lines designated 252 are provided for the various operating parts, so as to protect the same from dust and dirt. The housing 40 for the ink roller 41 also subserves the same purpose and prevents dust from accumulating upon the surface of said roller.

While I have herein shown and described what I have found to be a very practical embodiment of my invention, it is nevertheless to be understood that the several mechanisms may also be exemplified in various other combinations and arrangements of parts, and that I therefore reserve the privilege of adopting all such legitimate changes, as may be fairly embodied within the spirit and scope of the appended claims.

I claim:

1. In a label attaching machine, paper strip printing and feeding mechanism, including a drum, circumferentially extending feeding members on opposite sides of the drum, tangentially adjustable feeding members arranged between the said circumferential members and printing means on the drum between said feeding members.

2. In a label attaching machine, printing and feeding mechanism, including a drum, an operating shaft on which the drum is loosely mounted, adjustable paper strip feeding means carried by said drum, printing means on the drum, a spring held rod mounted in the drum for rocking movement, a lug on said operating shaft, and an arm on one end of said rod to engage the lug and thereby cause the drum to rotate with said shaft in one direction.

3. In a label attaching machine, printing and feeding mechanism, including a drum, an operating shaft on which the drum is loosely mounted, adjustable paper strip feeding means carried by said drum, printing means on the drum, a rod mounted in the drum for rocking movement, an arm on one end of said rod, said drum having a kerf intersected by said rod, a lug on said operating shaft and a spring fixed to the drum head and disposed within said kerf, said rod having a flat surface engaged by said spring whereby the rod is held against turning movement, and the arm maintained in engagement with said lug to cause the rotation of the drum in one direction with said shaft.

4. In a label attaching machine, a guide table for the paper strip, a strip feeding and printing drum mounted above said table, said table having an opening therein, a platen roller mounted beneath the table and projecting through said opening, a spring element fixed to the table and holding the paper strip upon the surface thereof in advance of said opening, paper guide means at the opposite side of the platen roller, and means for adjusting said roller to cause the paper strip at the point of printing contact to assume a reverse curvature relative to the printing drum.

5. In a label attaching machine, a guide table for a paper strip, a label printing drum mounted above said table, means for feeding the paper strip over the table, a label holder mounted for vertical movement at one end of the table, a knife blade movable between the table and holder to sever the label from the paper strip, said holder consisting of spaced side plates and a base flange on one of said plates, a spring to clamp one edge of the label on said flange, but permitting of the lateral removal of the label from the holder after its attachment to the goods, and a common means for actuating the holder and the paper cutting knife.

6. In a label attaching machine, a label printing and feeding drum, means for rotating said drum, a guide table for the paper strip, a friction feed device, means for retaining a paper strip roll in contact with said device and guiding the gravity movement of said roll, said device including a shaft means operatively connecting said shaft to the drum rotating means and a sleeve frictionally engaged on said shaft and having means to frictionally engage the paper strip, said sleeve being manually rotatable independently of said shaft to initially position the paper strip relative to said drum, and mechanical means for operating said device to feed the paper strip to said drum.

7. In a label attaching machine, a label printing and feeding drum, means for rotating said drum, a guide table for a paper strip, a friction feed device, means for retaining a paper strip roll in contact with said device and guiding the gravity movement of said roll, said device including a shaft, means operatively connecting said shaft to the drum rotating means, and a sleeve frictionally engaged on said shaft and having means to frictionally engage the paper strip, and mechanical means for operating said device to feed the paper strip to said drum.

In testimony that I claim the foregoing as my invention, I have signed my name hereunder.

MAX O. CLAUSS.